A. BOURRIEU.
VIBRATION RECORDER.
APPLICATION FILED APR. 1, 1920.

1,367,941.

Patented Feb. 8, 1921.

Inventor
ALBERT BOURRIEU
By Alfred T. Gage
Attorney

UNITED STATES PATENT OFFICE.

ALBERT BOURRIEU, OF RIDGEFIELD PARK, NEW JERSEY.

VIBRATION-RECORDER.

1,367,941.  Specification of Letters Patent.  Patented Feb. 8, 1921.

Application filed April 1, 1920. Serial No. 370,414.

*To all whom it may concern:*

Be it known that I, ALBERT BOURRIEU, citizen of the United States, residing at Ridgefield Park, in the county of Bergen and State of New Jersey, have invented certain new and useful Improvements in Vibration-Recorders, of which the following is a specification.

This invention relates to a vibration recorder and is particularly adapted for application to automobiles or other vehicles to indicate by coöperation with a time mechanism the periods during which such vehicle is operated.

The invention has for an object to provide a novel and improved construction in which a marker is mounted to track upon a time controlled dial or chart and to be automatically shifted from one path to another concentric thereto and to be automatically stopped when the capacity of the chart is reached.

Another object of the invention is to provide a novel structure comprising a controlling wheel having concentric collars or tracks thereon adapted to guide a marker coöperating with a time controlled chart and provided with means for shifting the marker from one track to another in the continued operation of the recorder.

A further object of the invention is to present a vibratory chart marker mounted upon a resilient weighted member disposed to vary the path of travel of the marker transversely to its normal path upon a rotated chart and thereby indicate the extent and degree of vibration transmitted thereto by a vehicle when in movement.

Another object of the invention is to provide a novel arrangement of parts in which a dial chart is rotated by a clock movement and coöperates with a marker adapted to be automatically shifted to different positions relative to the axis of the chart, and means controlled by said shifting means to automatically engage and stop said clock movement when the capacity of the chart has been reached.

Other and further objects and advantages of the invention will be hereinafter set forth and the novel features thereof defined by the appended claims.

In the drawing—

Like numerals refer to like parts in the several figures of the drawing.

Figure 1:
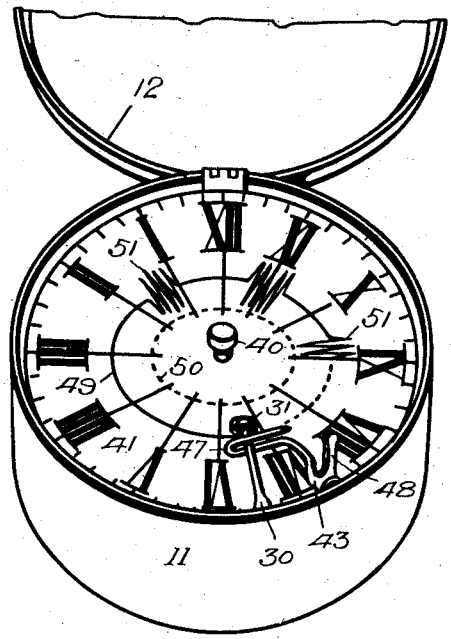
Figure 1 is a perspective of the recorder.

The numeral 10 designates a clock movement which may be of any desired character and inclosed by a suitable casing 11 provided with a cover 12. Upon the post 13 of the hand pinion of this movement a controlling wheel 14 is secured and may be provided with gear teeth 15 meshing with a suitable driven pinion 16. This wheel is provided upon one face with an interrupted outer collar or track 17 and an inner concentric track 18 having a release opening 19 therethrough. The opening 20 in the outer track 17 is not in alinement with the opening in the inner track body which has an inturned end at the release opening 19 therein.

Coöperating with these tracks is a shifting arm 21 which has a shoe 22 traveling upon the outer face of the tracks. This arm is mounted upon the slide block 23 disposed in the guide frame 24 secured to the frame of the clock movement and is tensioned toward the wheel by spring 32 extending from a lug 35 on the block to a lug 36 upon the guide frame. This block also carries an angular bracket 25 having mounted upon its free end a coiled spring 26, the extended ends 27 of which are provided with equalizing weights 28. Upon one of these ends a marker standard 29 is secured and the free end 30 thereof is extended laterally and carries a marker 31 of any desired character, such as a stylus or pencil. The arm 21 may be formed of resilient material so that its shoe may be withdrawn from engagement with the wheel track when manually restoring or resetting the parts, for instance by means of the handle 42.

The shoe of the shifting arm is retained in constant contact with the wheel tracks by the expanded tension spring 32 which also automatically shifts the arm from one track to the other when the opening in the outer track is reached. When the shoe on the arm enters the opening in the inner track this spring further shifts the arm to lock the clock movement. This locking may be effected by any desired means, for instance, a stop bar 33 secured to the bracket 25 and adapted to be projected to contact with the balance wheel 34 of the clock movement by the spring 32.

The post 13 is formed with a threaded extension 37 having a support 38 at its base upon which the chart plate 39 rests and into contact with which it is clamped by a set screw 40. This plate is spaced from the casing 11 to permit vibration of the marker, as indicated by dotted lines in Fig. 2. Upon the plate a removable dial or chart 41 of any desired character is disposed, but preferably having the hour and minute indications thereon as shown.

For the purpose of lifting and retaining the marker out of contact with the chart, a lever 43 is mounted upon the casing 11 in any desired manner, such as on a pivoting stud 44 secured to the casing and carrying a tension spring 45 interposed between the lever and casing. A set screw 46 secures the lever upon the stud and under the frictional tension of the spring 45 to retain the lever in its shifted position. The free end of the lever is formed into a looped finger 47 through which the marker standard passes and this finger permits free vibration of the marker when in contact with the chart and also lifts the marker therefrom. The lever 43 may be provided with any suitable handle 48 for its convenient operation.

Figure 2:
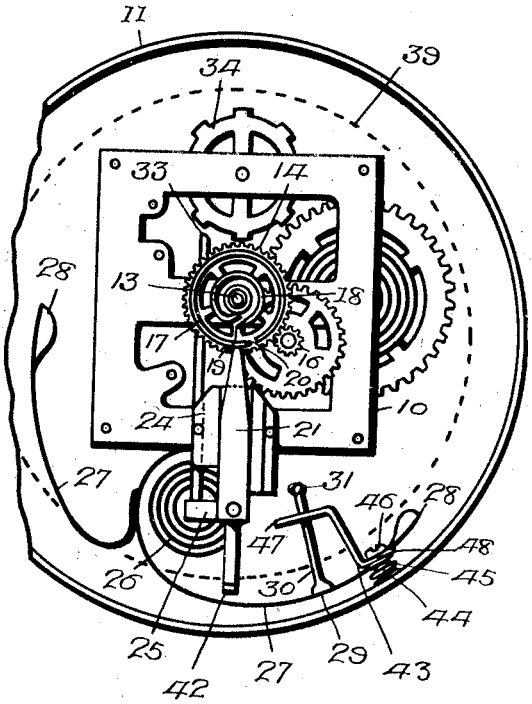
Fig. 2 is an elevation thereof with the chart plate removed.
Figure 3:
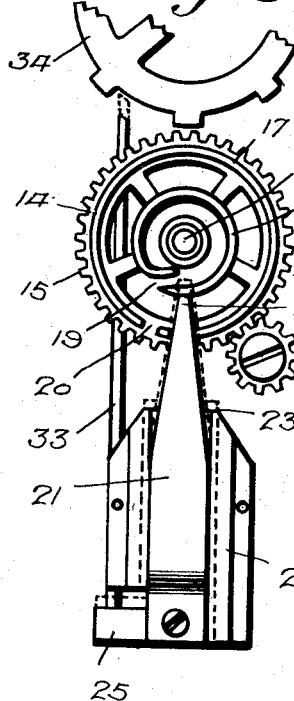
Fig. 3 is a similar enlarged view of the controlling wheel and shift arm.
Figure 4:
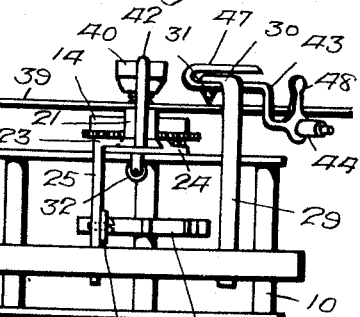
Fig. 4 is a side elevation thereof.
Figure 5:
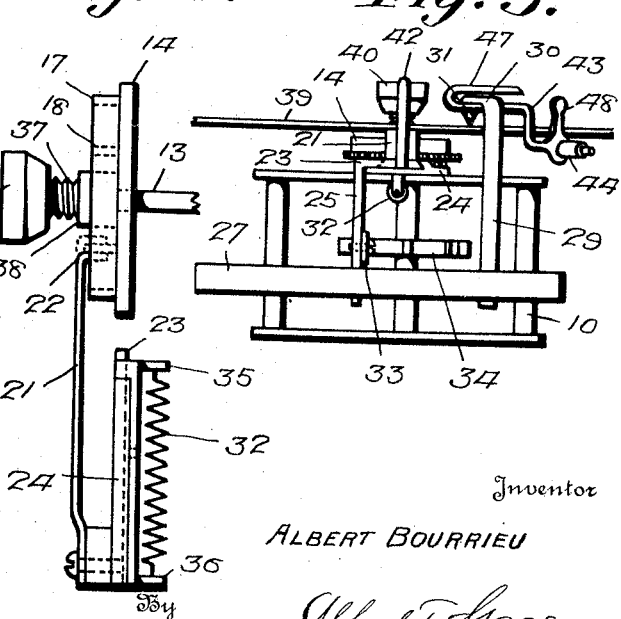
Fig. 5 is an edge view of the operating parts.

As shown in Fig. 1, the marker first traverses the path 49 upon the chart as the latter rotates during the first twelve hour period. At this time the resilient shift arm is in contact with the outer track and when its shoe reaches the opening therein it is automatically shifted by the tension spring into contact with the inner track, and the marker then traverses the path 50 upon the chart as indicated by dotted lines. The openings in these tracks are out of alinement so that the shoe in shifting from the outer to the inner track engages the wall of the latter, and when the end of this track is reached the arm automatically shifts to lock the clock movement as described. Any movement of the vehicle causes a vibration of the marker transversely of the paths 49 and 50 thus producing indications 51 across the normal path of travel and the extent or lateral degrees of these indications clearly shows the character of road or paving over which the vehicle was operated. The relation of these vibration indications to the time marking upon the chart records the time periods during which the vehicle was in use. When it is desired to replace the chart and reset the marker, the chart and its supporting plate are removed from the post which exposes the resilient shifting arm, and the latter is lifted from within the inner track and slid to its initial position in contact with the outer track as shown in Fig. 2. In Fig. 3 the arm shoe is shown by full lines in contact with the inner track and by dotted lines in its locking position.

The use of a twelve hour chart has been found desirable as it reduces the size of the recorder and provides more space between the numerals thereon for the vibration indications. In the use of such a chart for a twenty four hour period it is necessary to provide separate paths for the indications during each twelve hour period and this invention is adapted to automatically perform this function and finally lock the clock movement. The operation of the invention will be apparent from the foregoing description and it will be seen that it presents a simple, efficient and economically manufactured construction adapted to accurately indicate any movement of the vehicle in which it is carried. This adapts the invention particularly for the detection of any unauthorized use of an automobile and records the time period during which such use occurred.

While the specific construction of this recorder has been shown and described still the invention is not confined thereto as changes and alterations may be made therein without departing from the spirit of the invention as defined by the following claims.

What I claim is—

1. In a vibration recorder, a rotatable time controlled dial chart, a track member carried by the time mechanism, a marker mounted to coöperate therewith, and means to automatically shift said marker from one track to another upon said member to operate in concentric paths relative to the axis of said chart.

2. In a vibration recorder, a rotatable time controlled dial chart, a marker mounted to coöperate therewith, means to automatically shift said marker to operate in concentric paths relative to the axis of said chart, and means for automatically stopping the rotation of said chart when the capacity thereof is reached.

3. In a vibration recorder, a rotatable time controlled member having a plurality of tracks and a dial chart, a marker supported from said member to coöperate with said chart, tension means to automatically shift said marker from one track to another to operate in concentric paths relative to the axis of said chart, and means for vibrating said marker transversely to the path thereof upon said chart.

4. In a vibration recorder, a time mechanism provided with a track member, a dial chart carried by said mechanism, a marker mounted to coöperate with said member and chart, means to automatically shift said marker toward the axis of the chart for release from said track member, and means for vibrating said marker.

5. In a vibration recorder, a clock movement, a dial chart rotated thereby, a marker disposed to coöperate with said chart, a wheel carried by said clock movement and having a plurality of guiding members thereon, means connecting said marker with said guide members, means for automatically shifting said connecting means from one guide member to another, and means for vibrating said marker.

6. In a vibration recorder, a clock movement, a dial chart rotated thereby, a marker disposed to coöperate with said chart, a wheel carried by said clock movement and provided with concentric flanges, a shifting bar connected with said marker and disposed to engage said flanges, means for automatically shifting said bar from one flange to another, and means for vibrating said marker.

7. In a vibration recorder, a clock movement, a dial chart rotated thereby, a marker disposed to coöperate with said chart, a wheel carried by said clock movement and provided with concentric flanges, a shifting bar connected with said marker and disposed to engage said flanges, means for automatically shifting said bar from one flange to another, and a resilient device upon said bar for vibrating said marker relative thereto.

8. In a vibration recorder, a clock movement, a dial chart rotated thereby, a marker disposed to coöperate with said chart, a wheel carried by said clock movement and provided with concentric flanges, a shifting bar connected with said marker and disposed to engage said flanges, means for automatically shifting said bar from one flange to another, a resilient device upon said bar for vibrating said marker relative thereto, and stop means carried by said bar and arranged to engage said clock movement when the bar completes its travel upon said flanges.

9. In a vibration recorder, a clock movement, a dial chart rotated thereby, a controlling wheel actuated by said movement and having interrupted guide flanges thereon, a shifting arm disposed to engage either of said flanges, means for shifting said arm through the opening in one flange into contact with the other flange, a vibrating device carried by said arm, and a marker mounted upon said device to coöperate with said chart.

10. In a vibration recorder, a clock movement, a dial chart rotated thereby, a controlling wheel actuated by said movement and having interrupted guide flanges thereon, a shifting arm disposed to engage either of said flanges, tension means for shifting said arm through the opening in one flange into contact with the other flange, a coiled spring having weighted members carried by said arm, and a marker mounted upon said spring to coöperate with said chart.

11. In a vibration recorder, a clock movement, a dial chart rotated thereby, a controlling wheel actuated by said movement and having concentric guide flanges with openings therethrough, a shifting arm constructed to successively contact with the outer face of each of said flanges, means tensioning said arm toward said flanges, a vibrating device supported by said arm, and a marker carried by said device to coöperate with said chart.

12. In a vibration recorder, a clock movement, a dial chart rotated thereby, a controlling wheel actuated by said movement and having concentric guide flanges with openings therethrough, a shifting arm constructed to successively contact with the outer face of each of said flanges, means tensioning said arm toward said flanges, a vibrating device supported by said arm, a marker carried by said device to coöperate with said chart, means upon the inner flange to release the arm therefrom, and a connection from said arm disposed to engage and stop the clock movement.

13. In a vibration recorder, a clock movement, a dial chart rotated thereby, a controlling wheel actuated by said movement and having concentric guide flanges with openings therethrough, a sliding shifting arm having its free end in contact with one of said flanges, a spring connected to said arm to hold the same in contact with said flange, a spring member carried by said arm, and a marker carried by said member to vibrate upon said chart.

14. In a vibration recorder, a clock movement, a dial chart rotated thereby, a controlling wheel actuated by said movement and having concentric guide flanges with openings therethrough, a sliding shifting arm having its free end in contact with one of said flanges, a spring member carried by said arm, a marker carried by said member to vibrate upon the chart, and a locking bar carried by said arm to engage a portion of the clock movement.

15. In a vibration recorder, a clock movement, a dial chart rotated thereby, a controlling wheel having concentric guide flanges, the outer flange being provided with an opening in alinement with the body of the inner flange and the latter having an inturned releasing end, a shifting arm disposed to successively engage said flanges, and a vibrating marker carried by said arm to coöperate with said chart.

16. In a vibration recorder, a clock movement, a dial chart rotated thereby, a controlling wheel having concentric guide flanges, the outer flange being provided with an opening in alinement with the body of the inner flange and the latter having an inturned releasing end, a shifting arm disposed to successively engage said flanges, a vibrating marker carried by said arm, and a stop connection extending from said arm to engage a member of the clock movement when the arm reaches said releasing end.

17. In a vibration recorder, a clock movement, a dial chart rotated thereby, a controlling wheel actuated by said movement and having concentric guide flanges with openings therethrough, a fixed supporting frame, a shifting arm slidingly mounted therein and disposed to engage said flanges, a spring connected to said arm and frame, an angular extension from said arm, a vibrating spring thereon, and a marker carried by said spring to coöperate with said chart.

18. In a vibration recorder, a clock movement, a dial chart rotated thereby, a controlling wheel actuated by said movement and having concentric guide flanges, a fixed support, a shifting arm slidingly mounted therein and disposed to engage said flanges, an angular extension from said arm, a vibrating spring thereon, a marker carried by said spring to coöperate with said chart, and a locking bar carried by said extension and slidable upon said support parallel with said arm.

19. In a vibration recorder, a casing, a clock movement therein, a dial chart rotated by said movement, a controlling wheel carried by the movement and provided with a plurality of tracks, a shifting arm adapted to successively engage said tracks, a vibrating member upon said arm, and a marker carried by said member to coöperate with said chart.

20. In a vibration recorder, a casing, a clock movement therein, a dial chart rotated by said movement, a controlling wheel carried by the movement, a shifting arm engaging said wheel, a vibrating member upon said arm, a marker carried by said member, and a locking member carried by said arm to engage said clock movement.

21. In a vibration recorder, a casing, a clock movement therein, a dial chart rotated by said movement, a controlling wheel carried by the movement, a shifting arm engaging said wheel, a vibrating member upon said arm, a marker carried by said member to coöperate with said chart, and a lever mounted upon said casing and engaging said marker to lift and retain the same out of contact with said chart.

22. In a vibration recorder, a casing, a clock movement therein, a dial chart rotated by said movement, a controlling wheel carried by the movement, a shifting arm engaging said wheel, a vibrating member upon said arm, a marker carried by said member to coöperate with said chart, and a lifting lever pivoted upon the casing and having a looped free end engaging said marker to permit lateral movement thereof.

23. In a vibration recorder, a clock movement, a dial chart carried thereby, a controlling wheel actuated by said movement, a resilient shifting arm engaging said wheel, a vibrating member upon said arm, an angular standard secured to said member, and a marking device carried by the free end of said standard to coöperate with said chart.

In testimony whereof I affix my signature.

ALBERT BOURRIEU.